United States Patent [19]

Shannon et al.

[11] Patent Number: 4,755,586

[45] Date of Patent: Jul. 5, 1988

[54] METHOD FOR PREPARING CROSSLINKABLE POLYCYCLIC POLYCARBONATE OLIGOMER COMPOSITIONS WITH SUPPRESSION OF AQUEOUS EMULSION FORMATION

[75] Inventors: Thomas G. Shannon, Schenectady; Daniel J. Brunelle, Scotia, both of N.Y.

[73] Assignee: General Electric Company, Schenectady, N.Y.

[21] Appl. No.: 29,518

[22] Filed: Mar. 24, 1987

[51] Int. Cl.$^4$ .............................................. C08G 63/62
[52] U.S. Cl. .................... 528/199; 528/196; 528/198; 528/200; 528/204; 528/371
[58] Field of Search ............... 528/199, 198, 200, 371, 528/196, 204

[56] References Cited

U.S. PATENT DOCUMENTS 4,644,053  2/1987  Brunelle et al. .................... 528/371
4,650,852  3/1987  Evans et al. ........................ 528/199

Primary Examiner—Harold D. Anderson
Attorney, Agent, or Firm—William H. Pittman; James C. Davis, Jr.; James Magee, Jr.

[57] ABSTRACT

Polycyclic polycarbonate oligomers are prepared by the reaction of a bishaloformate and a tetrahydroxyaromatic compound (and optionally also a dihydroxy compound) in the presence of an olefinic tertiary amine and an aqueous slurry of an aldaline earth metal base. The proportion of water in the reaction mixture is up to about 15% by volume of the organic phase. The bishaloformate and hydroxy compounds, and most often also the amine, are preferably added gradually to the other materials.

18 Claims, No Drawings

METHOD FOR PREPARING CROSSLINKABLE POLYCYCLIC POLYCARBONATE OLIGOMER COMPOSITIONS WITH SUPPRESSION OF AQUEOUS EMULSION FORMATION

This invention relates to the preparation of polycyclic oligomeric compositions, and more particularly crosslinkable polycyclic polycarbonate oligomers.

Polycarbonates are well known polymers which have good property profiles, particularly with respect to impact resistance, electrical properties, optical clarity, dimensional rigidity and the like. These polymers are generally linear, but can be made with branched sites to enhance their properties in specific ways. Low levels of branching are generally incorporated into the resin by copolymerizing into the polymer backbone a polyfunctional reagent to yield a thermoplastic polycarbonate resin with enhanced rheological properties and melt strength which make it particularly suitable for such types of polymer processing procedures as the blow molding of large, hollow containers and the extrusion of complex profile forms. Special manufacturing runs must be set aside to prepare these branched polycarbonate resins.

Sufficiently higher levels of branching sites in the resin will cause resin chains actually to join to each other to form partially or fully crosslinked resin networks which will no longer be thermoplastic in nature and which are expected to exhibit enhancements over corresponding linear resins in physical properties and/or in their resistance to abusive conditions, such as exposure to organic solvents. A wide variety of means have been employed to produce crosslinking in polycarbonate resins. They generally involve the incorporation of a suitably reactive chemical group into the resin chain at its time of manufacture, as an additive to the resin after manufacture, or both. These reactive groups and the reactions they undergo are generally different from those characteristic of polycarbonate resins themselves and therefore tend to have detrimental side effects on the physical and/or chemical properties of the polymer. The conventional test used to judge the success of these means for crosslinking is to observe the formation of gels due to the crosslinked material when a resin sample is mixed with a solvent, such as methylene chloride, in which normal linear polycarbonate resin is highly soluble.

In copending, commonly owned application U.S. Ser. No. 913,908, filed Oct. 1, 1986, there are disclosed polycyclic oligomers capable of being converted to crosslinked polycarbonates. These polycyclic oligomers may be prepared by a method similar to that disclosed in U.S. Pat. No. 4,644,053 for the preparation of cyclic polycarbonate oligomers, including a condensation reaction between at least one bishaloformate having the formula $$R^1(OCOX^1)_2 \quad (I)$$

and at least one tetrahydroxyaromatic compound having the formula

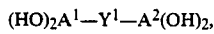

$$(HO)_2A^1{-}Y^1{-}A^2(OH)_2,$$

wherein $R^1$ is a divalent aromatic radical, each of $A^1$ and $A^2$ is a trivalent aromatic radical, $Y^1$ is a bridging radical in which one or two atoms separate $A^1$ from $A^2$ and $X^1$ is chlorine or bromine. The condensation reaction takes place interfacially when a solution of said compounds in a substantially non-polar organic liquid is contacted with a tertiary amine from a specific class and an aqueous alkali metal hydroxide solution. Among the tetrahydroxyaromatic compounds used are various tetrahydroxybiphenyls, bisresorcinols and bishydroquinones.

This method of preparation, when conducted as described in said application, may produce a minor proportion of water-insoluble hydrophilic gel as a by-product. Said gel frequently forms an emulsion with the aqueous phase of the reaction mixture. On a small scale, such as in a laboratory preparation, the gel and resulting emulsion presents no serious problems. However, in larger scale preparations it can cause the aqueous layer to lose fluidity, resulting in difficulties during product isolation.

One possible way to minimize the problems resulting from hydrophilic gel formation is to employ a very low proportion of water with respect to the organic phase of the reaction mixture. However, this is difficult when alkali metal hydroxides such as sodium hydroxide are used, since it is difficult to maintain the pH in the desired range (typically about 11-13) when a highly concentrated base solution is employed. In most instances, it is preferred to employ a base solution no higher than about 5 M in concentration, and this requires a relatively high proportion of water.

By the present invention, the proportion of gel produced in the preparation of polycyclic oligomers is minimized. Moreover, any gel which forms coagulates in a relatively short time and may be easily removed by filtration.

Accordingly, the present invention is a method for preparing a composition comprising polycyclic polycarbonate oligomers which comprises contacting (A) a composition comprising a mixture of (1) at least one compound of formula I with (2) at least one tetrahydroxyaromatic compound of the formula

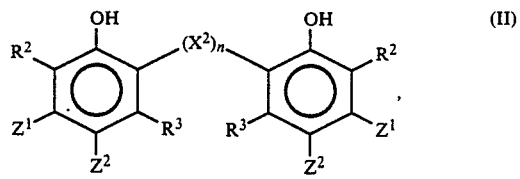

wherein:
each of $R^2$ and $R^3$ is hydrogen, $C_{1-4}$ alkyl or halo;
$X^2$ is oxygen, sulfur, $CH_2$, CO, SO or $SO_2$;
one of $Z^1$ and $Z^2$ is hydrogen, $C_{1-4}$ alkyl or halo and the other is hydroxy; and
n is 0 or 1;
said mixture optionally also containing (3) at least one dihydroxy compound having the formula (III) $R^4(OH)_2$, wherein $R^4$ is a divalent aliphatic or alicyclic radical; with
(B) at least one oleophilic aliphatic or heterocyclic tertiary amine and
(C) an aqueous slurry of an alkaline earth metal base;
said contact being effected under conditions resulting in high dilution of reagent A, or the equivalent thereof, in a substantially non-polar organic liquid which forms a two-phase system with water, for a period of time sufficient to form said polycyclic oligomers;

the proportion of water in the reaction mixture being up to 15% by volume of the organic phase.

Suitable $R^1$ values in the compounds of formula I include m-phenylene, p-phenylene, 4,4'-biphenylene, 2,2-bis(4-phenylene)propane and similar radicals such as those which correspond to the dihydroxyaromatic compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

The $R^1$ radicals preferably have the formula (IV) —$A^3$—$Y^2$—$A^4$—, wherein each of $A^3$ and $A^4$ is a divalent monocyclic aromatic radical and $Y^2$ is a bridging radical in which one or two atoms separate $A^3$ from $A^4$. The free valence bonds in formula IV are usually in the meta or para positions of $A^3$ and $A^4$ in relation to $Y^2$. Such $R^1$ values may be considered as being derived from bisphenols of the formula HO—$A^3$—$Y^2$—$A^4$—OH.

In formula IV, the $A^3$ and $A^4$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^3$ and $A^4$ are preferably p-phenylene, although both may be o- or m-phenylene or one o- or m-phenylene and the other p-phenylene.

The bridging radical, $Y^2$, is one in which one or two atoms, preferably one, separate $A^3$ from $A^4$. It is most often a hydrocarbon radical and particularly a saturated radical such as methylene, cyclohexylmethylene, neopentylidene, 2-[2.2.1]bicycloheptylmethylene, ethylene, ethylidene, isopropylidene, cyclohexylidene, cyclopentadecylidene, cyclododecylidene or adamantylidene, especially an alkylidene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula IV is the 2,2-bis(4-phenylene)propane radical, which is derived from bisphenol A and in which $Y^2$ is isopropylidene and $A^3$ and $A^4$ are each p-phenylene.

The $R^2$ and $R^3$ groups in the compounds of formula II may be hydrogen; $C_{1-4}$ alkyl groups such as methyl, ethyl, n-propyl, isopropyl, n-butyl or t-butyl; or halogen atoms such as chlorine and bromine. Hydrogen, methyl, chlorine and bromine are preferred, with hydrogen and methyl being especially preferred.

The linking $X^2$ radical may be methylene, sulfur, sulfoxy or sulfone, with methylene frequently being preferred. Biphenyls (wherein n is 0) may also be employed. Of the $Z^1$ and $Z^2$ values, one must be hydroxy and the other must be hydrogen, alkyl or halo as defined for $R^2$ and $R^3$.

The structural units of formula II may be considered as being derived from the corresponding tetrahydroxyaromatic compounds. Illustrative compounds of this type are bis(2,4-dihydroxy-3-methylphenyl)methane, 2,2',4,4'-tetrahydroxybiphenyl, 2,2',4,4'-tetrahydroxybenzophenone, bis(2,4-dihydroxyphenyl) sulfide, bis(2,4-dihydroxyphenyl) sulfoxide and bis(2,5-dihydroxyphenyl) sulfone.

Certain of these tetraphenols, particularly the bis(2,4-dihydroxy-3-alkylphenyl)methanes, are novel compounds whose preparation is described in the aforementioned application. Ser. No. 913,908. The following example is illustrative. All parts are by weight.

EXAMPLE 1

To a solution of 248.14 parts (2 moles) of 2-methylresorcinol in one liter of 2 M aqueous hydrochloric acid was added 32.6 parts of 38% aqueous formaldehyde solution (0.4 mole of formaldehyde). The mixture was stirred for two hours at about 20° C., whereupon a white solid precipitated. It was removed by filtration, washed several times with water and dried. The product was shown by infrared and nuclear magnetic resonance spectroscopy to be the desired bis(2,4-dihydroxy-3-methylphenyl)methane. The yield was 49.2 parts, or 50% of theoretical.

The polycyclic oligomers prepared by the method of this invention include dimers, trimers and tetramers similar to those disclosed in the following U.S. patents:

| | |
|---|---|
| 3,155,683 | 3,386,954 |
| 3,274,214 | 3,422,119. |

They also include polycyclic oligomer mixtures similar to the mixtures disclosed in U.S. Pat. No. 4,644,053, the disclosure of which is incorporated by reference herein.

The polycyclic oligomer mixtures prepared by the method of this invention consist essentially of oligomers having degrees of polymerization from 2 to about 30 and preferably to about 20, with a major proportion being up to about 12 and a still larger proportion up to about 15. Since they are mixtures, these compositions have relatively low melting points as compared to single compounds. The polycyclic oligomer mixtures are generally liquid at temperatures above 300° C. and most often at temperatures above 225° C.

Said mixtures contain very low proportions of acyclic oligomers (if any), generally undetectable amounts and very seldom more than about 5% by weight. They also contain low percentages (if any), frequently less than 30%, of polymers (linear or cyclic) having a degree of polymerization greater than about 30.

Reagent A, as indicated, is a composition comprising a mixture of compounds of formulas I and II (reagents A-1 and A-2, respectively) and, optionally, compounds of formula III (reagent A-3). Reagent A-1 may also contain oligomers of the formula

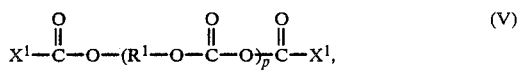

wherein $R^1$ and $X^1$ are as previously defined and n is a small number, typically about 1–4.

While $X^1$ may be chlorine or bromine, the bischloroformates, in which $X^1$ is chlorine, are most readily available and their use is therefore preferred. Frequent reference to bischloroformates will be made hereinafter, but it should be understood that other bishaloformates may also be used. Suitable dihydroxy compounds of formula IX (reagent A-3) include diols having divalent radicals of formula IV which are different from the corresponding divalent radicals in the compound of formula I, as well as other dihydroxyaromatic compounds.

The proportion of reagent A-2 in the reaction mixture depends to some extent on the amount of crosslinking desired in the final linear polycarbonate. In general, about 0.5–10.0 mole percent (based on monomeric units in total reagent A), and especially about 1–5 mole percent, will produce a crosslinked product having the desired properties.

It is also possible to prepare an oligomer product having a higher proportion of crosslinkable units and to dilute it with a conventional cyclic oligomer product prior to formation of the crosslinked linear polycarbonate. Therefore, the presence of about 0.5–12.0 mole percent of component A-2 is contemplated. Higher proportions than about 12 mole percent may cause premature crosslinking via formation of branched polycarbonates. Reagent A-3, when present, generally comprises up to about 50% by weight, most often up to about 20% and preferably up to about 10%, of total reagent A.

The bischloroformate may be employed in substantially pure, isolated form or as a crude bischloroformate product. Suitable crude products may be prepared by any known methods for bischloroformate preparation. Typically, at least one bisphenol is reacted with phosgene in the presence of a substantially inert organic liquid, as disclosed in the following United States patents:

| | |
|---|---|
| 3,255,230 | 3,966,785 |
| 3,312,661 | 3,974,126. |

The disclosures of these patents are incorporated by reference herein. In addition to the bisphenol bischloroformate, such crude bischloroformate products may contain oligomer bischloroformates containing up to 4 bisphenol units. They may also contain minor amounts of higher oligomer bischloroformates and of monochloroformates corresponding to any of the aforementioned bischloroformates. Higher oligomer mono and bischloroformates are preferably present, if at all, only in trace amounts.

More preferably, the preparation of the crude bischloroformate product takes place in the presence of aqueous alkali. The pH of the reaction mixture may be up to about 12. It is generally found, however, that the proportion of high polymer in the cyclic oligomer mixture is minimized by employing a crude bischloroformate product comprising a major amount of bisphenol bischloroformate and only minor amounts of any oligomer bischloroformates. Such products may be obtained by the method disclosed in U.S. Pat. No. 4,638,077, the disclosure of which is also incorporated by reference herein. In that method, phosgene is passed into a mixture of a substantially inert organic liquid and a bisphenol, said mixture being maintained at a temperature within the range of about 10°–40° C., the phosgene flow rate being at least 0.15 equivalent per equivalent of bisphenol per minute when the temperature is above 30° C. An aqueous alkali metal or alkaline earth metal base solution is simultaneously introduced as necessary to maintain the pH of the aqueous phase in the range of 0.5–8. By this method, it is possible to prepare bischloroformate in high yield while using a relatively small proportion of phosgene, typically up to about 1.1 equivalent per equivalent of bisphenol.

When one of these methods is employed, it is obvious that the crude bischloroformate product will ordinarily be obtained as a solution in a substantially non-polar organic liquid such as those disclosed hereinafter. Depending on the method of preparation, it may be desirable to wash said solution with a dilute aqueous acidic solution to remove traces of base used in preparation.

The tertiary amines useful as reagent B ("tertiary" in this context denoting the absence of N-H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in the aforementioned U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the polycyclic oligomer mixture. For the most part, such amines contain at least about 6 and preferably about 6—14 carbon atoms.

The amines most useful as reagent B are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Reagent C is an aqueous slurry of an alkaline earth metal base such as magnesium hydroxide, calcium hydroxide, barium hydroxide or the corresponding oxides. Calcium hydroxide is generally preferred by reason of its availability, relatively low cost and particular suitability.

The fourth essential component is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-di-chlorobenzene and nitrobenzene; chlorinated aliphatic hydrocarbons such as chloroform and methylene chloride; and mixtures of the foregoing with ethers such as tetrahydrofuran.

To prepare the polycyclic oligomer mixture according to the method of this invention, the reagents and components are maintained in contact under conditions wherein reagent A is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed.

Typically, reagent A (i.e., a combination of all constituents thereof) is added gradually to a mixture of the other materials.

It is within the scope of the invention to incorporate reagent B in the mixture to which reagent A is added, or to add it gradually, either in admixture with reagent A or separately. It is often preferred for one initial large portion of reagent B (usually about 40–95% and preferably about 40–75% by weight of the total amount) to be present in the initial reaction mixture and the balance thereof to be added incrementally or continuously at the same time as reagent A.

Although addition of reagent A neat (i.e., without solvents) is within the scope of this embodiment, it is frequently inconvenient because many bischloroformates are solids. Therefore, it is preferably added as a solution in a portion of the organic liquid. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of polycyclic oligomers as opposed to high polymer and insoluble and/or intractable by-products, it is preferred to use not more than about 0.7 mole of reagent A (calculated as monomeric material) per liter of organic liquid present in the reaction system, including any liquid used to dissolve reagent A. Preferably, about 0.003–0.6 mole of reagent A is used when it consists entirely of reagents A-1 and A-2, and no more than about 0.5 mole is used when it contains reagent A-3. It should be noted that this is not a molar concentration in the organic liquid when reagent A is added gradually, since said reagent is consumed as it is added to the reaction system.

The entire portion of reagent C is generally present in the mixture to which reagent A is added. By reason of its presence as a slurry with only minor amounts dissolved in the aqueous phase, incremental or gradual addition thereof is unnecessary. In this regard, a further advantage of the use of calcium hydroxide as reagent C is its effectiveness, when present in the aqueous phase in saturation, to maintain a pH of about 11.8 which is particularly favorable for the reaction.

A critical feature of the invention is the proportion of water, said proportion being up to about 15% and preferably about 11–14%, by volume, of the organic phase. This proportion of water is adequate to maintain the alkaline earth metal base in effective concentration while minimizing emulsion formation with any gel produced during the reaction.

Under these conditions, the alkaline earth metal base is generally originally present in the reaction mixture in the form of a thin paste which may agglomerate on the sides of the reaction vessel, but which breaks up into discrete particles are the reaction progresses. Upon completion of the reaction, such particles are easily removed from the mixture by filtration. Any unreacted base and salts formed during the reaction may be removed from the reaction vessel by a simple acid wash. There may remain a small amount of crosslinked polycarbonate gel which may in turn be removed with a suitable organic solvent such as methylene chloride.

The method of this invention is illustrated by the following examples.

EXAMPLES 2–5

Various aqueous slurries of calcium hydroxide, having the consistency of a smooth, thin paste, were prepared and were blended with 100 ml. of methylene chloride and 1.29 grams (12.8 mmol.) of triethylamine. The mixture was heated to reflux, with rapid stirring. There was added thereto, over 40 minutes, a mixture prepared by adding a solution of 300 mg. (1.2 mmol.) of bis(2,4-hydroxyphenyl) sulfide in 0.8 ml. of tetrahydrofuran to a 1.06 M solution of bisphenol A bischloroformate in methylene chloride. An additional 640 mg. (6.35 mmol.) of triethylamine was added in 9 equal portions during bischloroformate addition.

When the additions were complete, the solids were removed by vacuum filtration and the organic layer was washed three times with dilute aqueous hydrochloric acid solution, once with dilute aqueous sodium hydroxide solution and three times with water. It was dried by passing through phase separation paper and vacuum stripped to yield the desired polycyclic oligomer mixture.

For comparison, two controls were run in which the calcium hydroxide was replaced by 125 mmol. of sodium hydroxide in the form of aqueous solutions. Isolation of the product was much more difficult, by reason of emulsion formation.

Other results are given in Table I.

TABLE I

| Example | $Ca(OH)_2$, mmol. | Molar ratio, C:A | Water Vol., ml. | Water % of org. phase | Product Recovery, % | Product % polycyclics |
|---|---|---|---|---|---|---|
| 2 | 67.5 | 1.25 | 9 | 6 | 90 | 40 |
| 3 | 67.5 | 1.25 | 12.5 | 8.3 | 82 | 65 |
| 4 | 101.3 | 1.88 | 14 | 9.3 | 86 | 69 |
| 5 | 135.1 | 2.50 | 18 | 12 | 89 | 71 |
| Control A | — | 2.31 | 25 | 16.7 | 63 | 79 |
| Control B | — | 2.31 | 12.5 | 8.3 | 76 | 76 |

The foregoing comparison shows that total product recovery is uniformly greater by the method of this invention than when sodium hydroxide solution is used. The proportion of polycyclics in the product according to the invention is equal to or less than when sodium hydroxide is used. However, the remainder of the product is high polymer which is generally not detrimental.

EXAMPLES 6–8

The procedure of Example 2 was repeated, with a sixfold increase in reagent amounts. The results are given in Table II.

TABLE II

| Example | $Ca(OH)_2$, mmol. | Molar ratio, C:A | Water Vol., ml. | Water % of org. phase | Product Recovery, % | Product % polycyclics |
|---|---|---|---|---|---|---|
| 6 | 810 | 2.49 | 108 | 12 | 96 | 84 |
| 7 | 944 | 2.90 | 120 | 13.3 | 99 | 78 |
| 8 | 1079 | 3.32 | 120 | 13.3 | 91 | 86 |

EXAMPLES 9–13

Following the procedure of 6, polycyclic oligomer mixtures are prepared from the following tetrahydroxyaromatic compounds, with similar results:

Example 9—bis(2,4-dihydroxy-3-methylphenyl)methane
Example 10—2,2',4,4'-tetrahydroxybiphenyl
Example 11—2,2',4,4'-tetrahydroxybenzophenone
Example 12—bis(2,4-dihydroxyphenyl) sulfoxide
Example 13—bis(2,5-dihydroxyphenyl) sulfone.

What is claimed is:

1. A method for preparing a composition comprising polycyclic polycarbonate oligomers which comprises contacting (A) a composition comprising a mixture of (1) at least one compound of the formula $$R^1(OCOX^1)_2 \qquad (I)$$

with (2) at least one tetrahydroxyaromatic compound of the formula

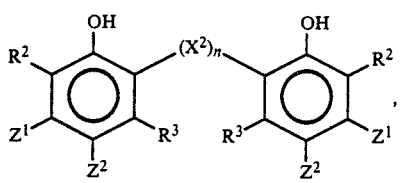

(II)

wherein:
$R^1$ is a divalent aromatic radical; each of $R^2$ and $R^3$ is hydrogen, $C_{1-4}$ alkyl or halo;
$X^1$ is chlorine or bromine;
$X^2$ is oxygen, sulfur, $CH_2$, CO, SO, or $SO_2$;
one of $Z^1$ and $Z^2$ is hydrogen, $C_{1-4}$ alkyl or halo and the other is hydroxy; and
n is 0 or 1;
or a mixture of (1) and (2) with (3) at least one dihydroxy compound having the formula $$R^4(OH)_2, \qquad (III)$$

wherein $R^4$ is a divalent aliphatic or alicyclic radical; with
(B) at least one oleophilic aliphatic or heterocyclic tertiary amine and
(C) an aqeuous slurry of an alkaline earth metal base;
said contact being effected under conditions resulting in high dilution of (A), or the eqivalent thereof, in a substantially non-polar organic liquid which forms a two-phase system with water, for a period of time sufficient to form said polycyclic oligomers;
the proportion of water in the raction mixture being up to 15% by volume of the organic phase.

2. A method according to claim 1 wherein $X^1$ is chlorine and (A) consists essentially of a mixture of (1) a compound of formula I in which $R^1$ has the formula $$-A^3-Y^2-A^4-, \qquad (IV)$$

wherein each of $A^3$ and $A^4$ is a divalent monocyclic aromatic radical and $Y^2$ is a bridging radical in which one or two atoms separate $A^3$ from $A^4$; and (2) a compound of formula II in which each of $R^2$ and $R^3$ is hydrogen or methyl.

3. A method according to claim 2 wherein (A) is added gradually to a mixture of the other materials.

4. A method according to claim 3 wherien each of $A^3$ and $A^4$ is p-phenylene and $Y^2$ is isopropylidene.

5. A method according to claim 4 wherein (B) is triethylamine, (C) is calcium hydroxide and the organic liquid is methylene chloride.

6. A method according to claim 5 wherein (A) comprises about 0.5–10.0 mole percent of the compound of formula II.

7. A method according to claim 6 wherein $Z^1$ is hydroxy and $R^2$, $R^3$, and $Z^2$ are each hydrogen.

8. A method according to claim 7 wherein n is 0.

9. A method according to claim 7 wherein n is 1.

10. A method according to claim 9 wherein $X^2$ is sulphur.

11. A method according to claim 9 wherein $X^2$ is CO.

12. A method according to claim 9 wherein $X^2$ is SO.

13. A method according to claim 6 wherein n is 1 and $X^2$ is $CH_2$.

14. A method according to claim 13 wherein $Z^1$ is hydroxy, $R^2$ is methyl and $R^3$ and $Z^2$ are each hydrogen.

15. A method according to claim 6 wherein n is 1 and $X^2$ is $SO_2$.

16. A method according to claim 15 wherein $Z^2$ is hydroxy and $R^2$, $R^3$ and $Z^1$ are each hydrogen.

17. A method according to claim 6 wherein (A) and (B) are added to a mixture of the other materials.

18. A method according to claim 17 wherein the proportion of water is about 11–14% by volume of the organic phase.

* * * * *